United States Patent [19]

Sasaki et al.

[11] Patent Number: 5,434,018
[45] Date of Patent: Jul. 18, 1995

[54] BATTERY PACK FOR VIDEO LIGHTING APPARATUS

[75] Inventors: Yuu Sasaki, Chiba; Junichi Iwasawa, Kanagawa; Masahiro Yamada, Yokohama, all of Japan

[73] Assignees: Sony Corporation; Asahi Research Corporation, both of Japan

[21] Appl. No.: 253,869

[22] Filed: Jun. 3, 1994

Related U.S. Application Data

[62] Division of Ser. No. 881,799, May 12, 1992, abandoned.

[30] Foreign Application Priority Data

May 17, 1991 [JP] Japan .................................. 3-113512

[51] Int. Cl.6 .............................................. H01M 2/10
[52] U.S. Cl. ........................................ 429/100; 429/96; 429/123
[58] Field of Search ................. 429/123, 178, 176, 97, 429/96, 100

[56] References Cited

U.S. PATENT DOCUMENTS 5,183,714  2/1993  Mitsui .................................. 429/123

*Primary Examiner*—John S. Maples
*Attorney, Agent, or Firm*—Ronald P. Kananen

[57] ABSTRACT

A lighting apparatus is comprised of an illumination unit arranged so as to project from a light apparatus body by a predetermined distance, a spring for spring-biasing the illumination unit in the direction in which the illumination unit is projected from the light apparatus body, a power switch for the illumination unit which is switched in accordance with a movement of the illumination unit, an engaging portion for engaging the illumination unit at the position close to the light apparatus body, and a releasing portion for releasing the engaging portion, wherein the lighting apparatus can be energized only when the illumination unit is projected from the lighting apparatus body. Also, an electrode apparatus attached to power source equipments such as a battery pack or the like is comprised of an electrode cover for shielding an electrode portion, wherein the electrode cover can be opened by a projected electrode portion of the equipments to which the power source equipment is attached.

10 Claims, 17 Drawing Sheets

BATTERY PACK FOR VIDEO LIGHTING APPARATUS

This application is a division of application Ser. No. 07/881,799 filed May 12, 1992, now abandoned.

BACKGROUND OF THE INVENTION

1. Field of the Invention

The present invention relates to a video lighting apparatus and an electrode apparatus such as a battery back or the like which is for use in such lighting apparatus.

2. Description of the Prior Art

With regards to lighting apparatus operable by batteries, there is known a video lighting apparatus that can be mounted on a portable video camera which is in use. In general, when in use, such video lighting apparatus is attached to the rear portion of the video camera and a lighting unit thereof is energized at the same time that the video camera starts the recording. Also, the video lighting apparatus is miniaturized as the video camera becomes smaller.

When the video lighting apparatus attached to the rear portion of the video camera is in use, in order to illuminate an object to be picked up and which is in front of the camera, the lighting unit thereof must be projected upwardly or laterally from the video lighting apparatus body by a relatively long distance so that the light is not shielded by the video lighting apparatus body. For this reason, the lighting unit of the conventional video lighting apparatus is projected from the video lighting apparatus body by a long distance so that the whole length thereof is increased. Such long video lighting apparatus is difficult for the user to handle.

Some known video lighting apparatus is designed such that a lighting unit thereof can be detached from the video lighting apparatus body when not in use. This type of video lighting apparatus has the problem such that, when the cameraman wishes to take a picture on the spot, the cameraman will lose a shutter release opportunity because the lighting unit cannot be attached to the video lighting apparatus body immediately. This problem is not limited to the video lighting apparatus, but rather is common to lighting apparatus such as flashlights or the like that can be operated by a battery.

FIG. 1 of the accompanying drawings shows a handy video camera 1 and a battery pack 2 used as a power supply of the video camera 1 according to the prior art. As shown in FIG. 2, electrode portions 21 provided on one surface of the battery pack 2 are formed to be flat with a small depression from a surface 22 in which the battery pack 2 is brought in contact with the video camera 1. This surface 22 will be referred to as the contact surface 22 for simplicity. The reason for this is that the electrode portions 21 must be prevented from inadvertently contacting with the contact surface 22 when the video camera 1 is not in use. The contact surface 22 has an engagement recess 24 which is fitted into an engagement tab 13 (see FIG. 3) as will be described later.

Electrode portions 11 of the video camera 1 are located at the positions matched to the electrode portions 21 of the battery pack 2. The electrode portions 11 are protruded in a pin-like manner and are retractable as shown in FIG. 3. To this end, the electrode portions 11 are outwardly spring-biased by a spring-biasing force of springs (not shown) provided therein. Under the condition such that the battery pack 2 is brought in contact with the video camera 1 in the direction shown by an arrow A in FIG. 3, slid and then attached to the video camera 1 as shown in FIG. 1, the electrode portions 11 of the video camera 1 are brought in contact with the electrode portions 21, of the battery pack 2 with a pressure by a spring-biasing force of the springs (not shown), whereby the the video camera 1 and the battery pack 2 are coupled to each other reliably.

When the battery back 2 is attached to the video camera 1 in actual practice, the contact surface 22 of the battery pack 2 is brought in contact with an attaching surface 15 of the video camera 1 and moved in the lateral direction in this state (as shown by the arrow A in FIG. 3) while one side end edge 23 (see FIG. 3) of the battery back 2 is made coincident with a reference line 12 marked on the video camera 1. At this time, the retractable engagement tab 13 provided on the video camera 1 is inserted into the engagement recess 24 of the battery pack 2 by a spring-biasing force of an inside spring (not shown), thereby restricting the attachment position of the battery pack 2 on the video camera 1. Furthermore, upper and lower engagement portions (not shown) of the video camera 1 and the battery pack 2 are engaged with one another, ensuring that the battery pack 2 is positively locked to the video camera 1.

The battery pack 2 is detached from the video camera 1 as follows.

First, the engagement between the engagement tab 13 and the engagement recess 24 is released by pulling a lock releasing lever 14 unitarily formed with the engagement tab 13 of the video camera 1 in the direction shown by a broken line arrow B in FIG. 3. In this state, the battery pack 2 is moved horizontally in the direction opposite to the direction when it is attached to the video camera 1, thereby the battery pack 2 being released from the video camera 1 with ease.

A plastic carrying case is exclusively prepared for the battery pack 2 so that the cameraman can carry the battery pack 2 alone. However, in some cases such as when the cameraman lost or forgot to bring the above-mentioned plastic case, the cameraman has to carry the battery pack 2, for example, in a bag or pocket of a suit. At that time, since the electrode portions 21 are exposed in the conventional battery pack 2, a metal piece or the like accidentally lying in the back or pocket touches the two electrode portions 21 simultaneously. As a result, the metal piece is heated or dissolved in some case.

As for power supply equipments, the exposed electrode portions may be short-circuited by such a metal piece causing an excess current to flow through an electric circuit, thereby damaging the electric circuit components.

OBJECTS AND SUMMARY OF THE INVENTION

Therefore, it is an object of the present invention to provide a lighting apparatus and an electrode apparatus thereof in which the aforesaid shortcomings and disadvantages encountered with the prior art can be substantially eliminated.

More specifically, it is an object of the present invention to provide a lighting apparatus in which an illumination unit is housed near a lighting apparatus body and can be momentarily projected from the light apparatus body when the light apparatus is in use.

Another object of the present invention is to provide a lighting apparatus which can be carried and be put conveniently in some suitable accommodating means.

A further object of the present invention is to provide an electrode apparatus in which an electrode portion is shielded except for the case such that the electrode apparatus is coupled to an electrode portion of other apparatus.

According to a first aspect of the present invention, a lighting apparatus is comprised of an illumination unit arranged so as to project from a light apparatus body by a predetermined distance, a spring for spring-biasing the illumination unit in the direction in which the illumination unit is projected from the light apparatus body, a power switch for the illumination unit which is switched in accordance with a movement of the illumination unit, an engaging portion for engaging the illumination unit at the position close to the light apparatus body, and a releasing portion for releasing the engaging portion, wherein the lighting apparatus can be energized only when the illumination unit is projected from the lighting apparatus body.

In accordance with a second aspect of the present invention, an electrode apparatus attached to power source equipments such as a battery pack or the like is comprised of an electrode cover for shielding an electrode portion, wherein the electrode cover can be opened by a projected electrode portion of the equipment to which the power source equipment is attached.

The above and other objects, features, and advantages of the present invention will become apparent from the following detailed description of illustrative embodiments thereof to be read in conjunction with the accompanying drawing, in which like reference numerals are used to identify the same or similar parts in the several views.

DETAILED DESCRIPTION OF THE PREFERRED EMBODIMENTS

The present invention will now be described in detail with reference to the drawings.

In a first embodiment, the lighting apparatus according to the present invention is applied to the above-mentioned video lighting apparatus. In order to understand the present invention more clearly, a specific example in which the video lighting apparatus is attached to the video camera in actual practice will be described with reference to FIG. 4 and the following sheets of drawings.

Figure 4:
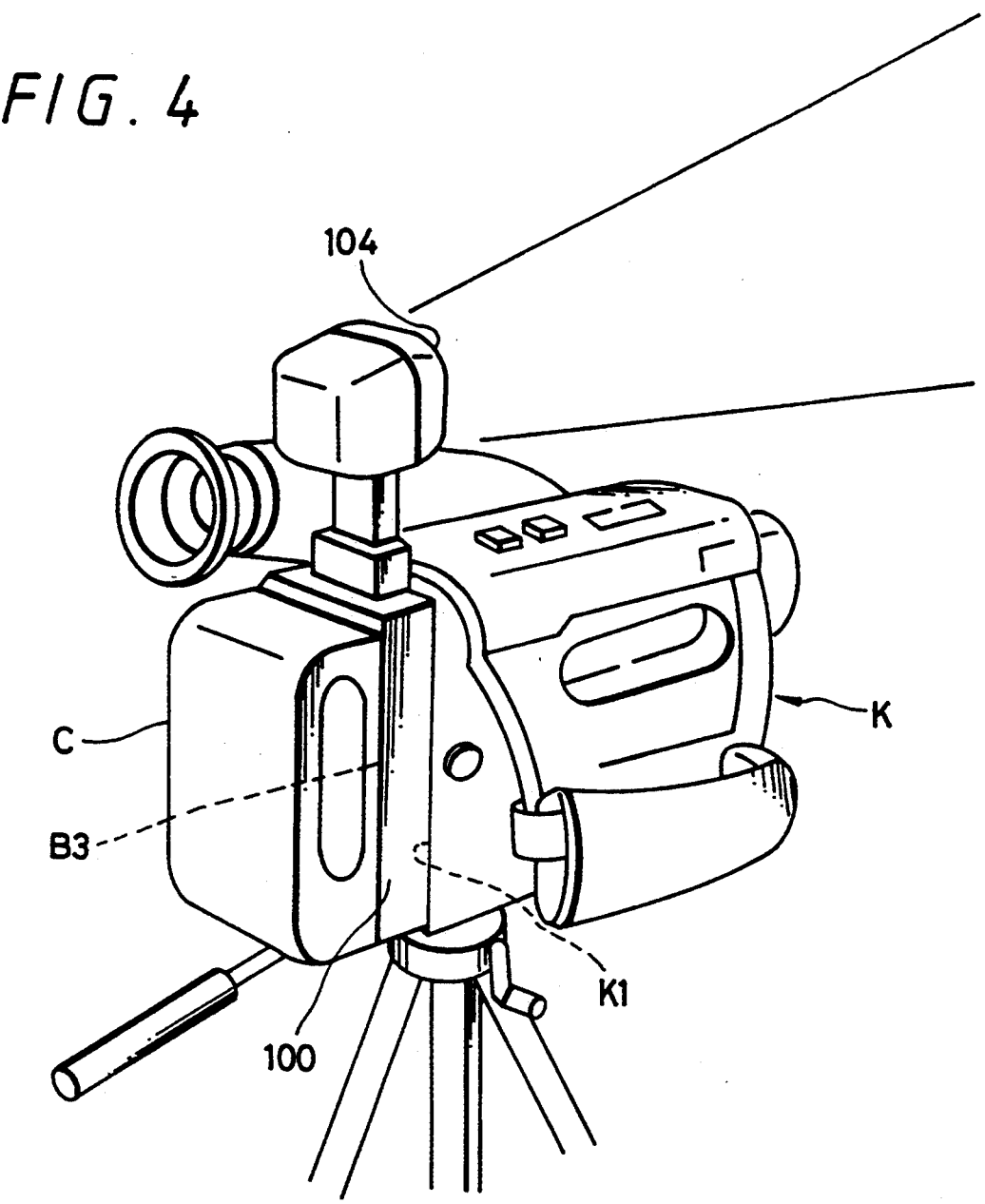
FIG. 4 is a perspective view of a video lighting apparatus according to the present invention and illustrating the condition such that the video lighting apparatus is attached to a video camera.

FIG. 4 of the accompanying drawings shows the condition such that a video lighting apparatus 100 to which the present invention is applied is attached to a video camera K. The video camera K is a small portable type video camera and a battery pack C is used as a power supply thereof. In this embodiment, the video lighting apparatus 100 is interposed between the video camera K and the battery pack C. The battery pack C is used as a power supply source of the video lighting apparatus 100. A lighting unit 104 of the video lighting apparatus 100 pops up from the body of the video camera K only when the video camera K is in use, so that the video camera K can be prevented from interrupting an illumination light from the lighting unit 104, as will be described later.

Figure 5:
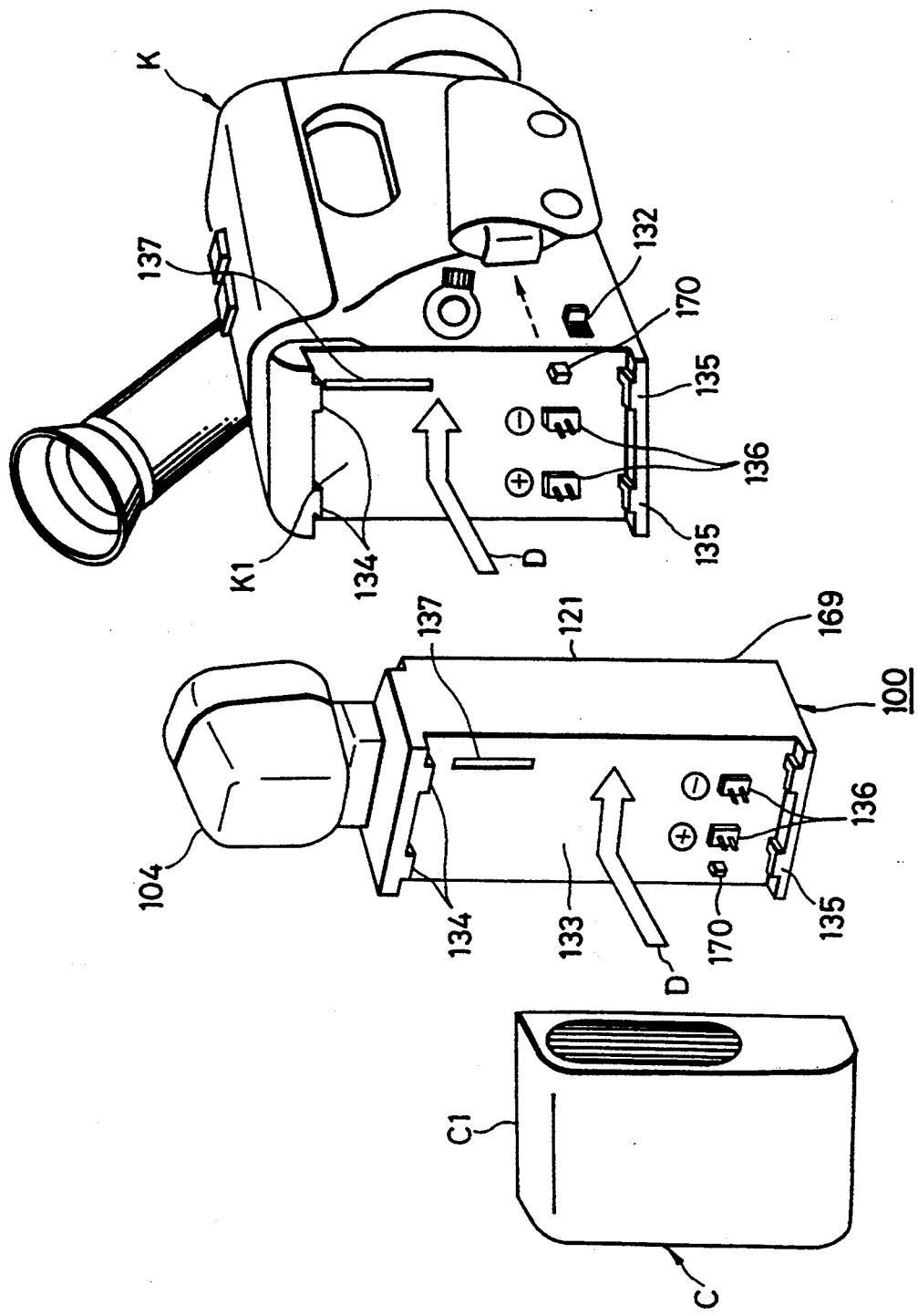
FIG. 5 is a perspective view of the video lighting apparatus, the video camera and a battery back to which references will be .made in explaining how to attach the battery pack and the video lighting apparatus to the video camera.

As shown in FIG. 5, an attachment surface K1 of the video camera K is molded as a recess shape into which there is fitted an attaching surface C1 of the battery pack C or a front surface 121 of the video lighting apparatus 100. To this end, the attaching surface C1 of the battery pack C and the front surface 121 of the video lighting apparatus 100 are similarly shaped and dimensioned.

Moreover, the battery pack C is attached to a rear surface 133 of the video lighting apparatus 100 and therefore the rear surface 133 is shaped and dimensioned similarly to the attaching surface K1 of the video camera K.

Figure 6:
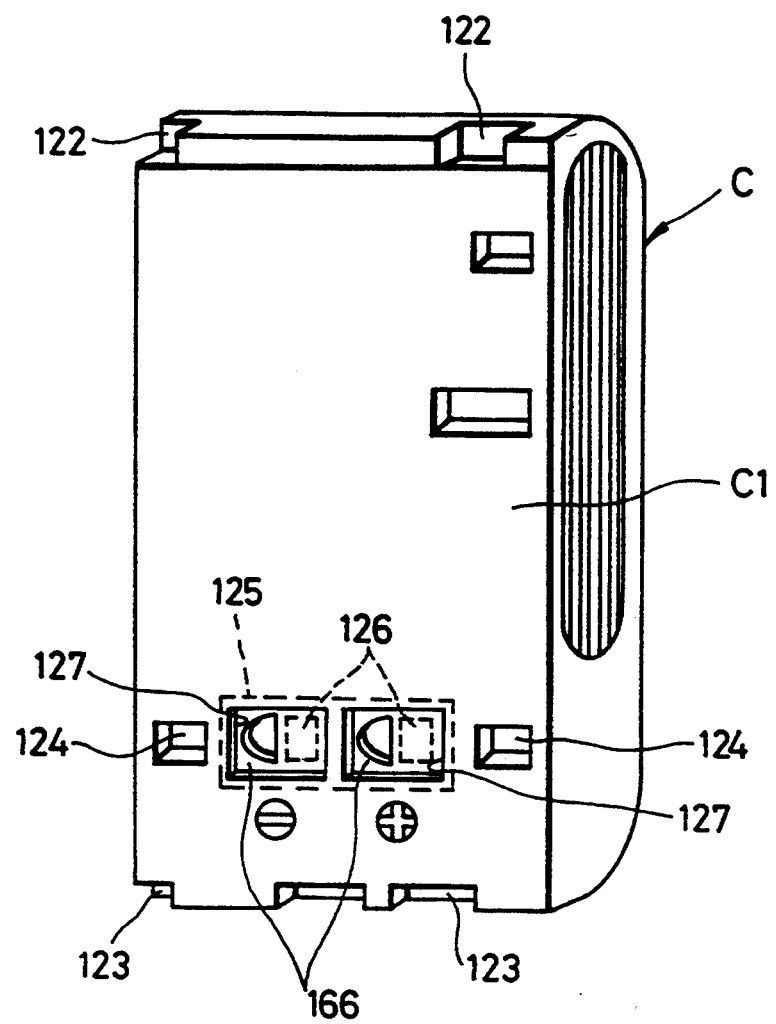
FIG. 6 is a perspective view of the battery pack to which the present invention is applied.

Electrode portions 136 having pin configurations are horizontally implanted on the attaching surface K1 of the video camera K and the rear surface 133 of the video lighting apparatus 100 and coupled to corresponding electrode portions 126 (see FIG. 6). Engagement portions 134 and 135 for engaging corresponding parts are formed on the attaching surface K1 of the video camera K and the rear surface 133 of the video lighting apparatus 100, and a reference line 137 acting as a reference in the attachment and a locking protrusion 170 are formed on the attaching surface K1 of the video camera K and the rear surface 133, as will be described more fully later.

As shown in FIG. 6, an electrode device 125 is housed in the attaching surface C1 side of the battery pack C. A similar electrode is located on the front surface 121 of the video lighting apparatus 100 (FIG 5). The electrode portions 126 are exposed only when they are coupled to the corresponding electrode portions 136 as will be described later. Further, engagement slots 123 are respectively formed on the upper and lower end portions of the surface C1. Locking slots 124 are formed on the lower portion of the battery pack C.

The attaching process of the devices will be described below.

When the video lighting apparatus 100 is attached to the video camera K, as shown in FIG. 5, a side end edge 169 of the video lighting apparatus 100 is fitted to the reference line 137 of the video camera K and the front surface 121 of the video lighting apparatus 100 is urged against the attaching surface K1 of the video camera K. Then, in this state, the video lighting apparatus 100 is horizontally moved in a predetermined direction, i.e., in the direction shown by an arrow D in FIG. 5.

As a consequence, the upper and lower engagement recesses 222 and 223 (see FIG. 7) of the video lighting apparatus 100 and the upper and lower engagement portions 134 and 135 of the video camera K are respectively engaged with one another and the locking protrusion 170 of the video camera K is inserted into the locking recess 224 of the video lighting apparatus 100, whereby the video lighting apparatus 100 is attached to the video camera K reliably.

At this time, an electrode lid 166 (see FIG. 6) of the video lighting apparatus 100 is opened by the protruded electrode portions 136 of the video camera K so that the electrode portions 136 and 126 are coupled electrically.

After the video lighting apparatus 100 is attached to the video camera K as described above, the battery pack C is attached to the rear surface 133 of the video lighting apparatus 100. The attaching surface C1 of the battery pack C is formed similarly to the front surface 121 of the video lighting apparatus 100 and therefore, the attaching process of the battery pack C is substantially the same as that of the video lighting apparatus 100.

The video lighting apparatus 100 will be described below in detail.

Figure 7:
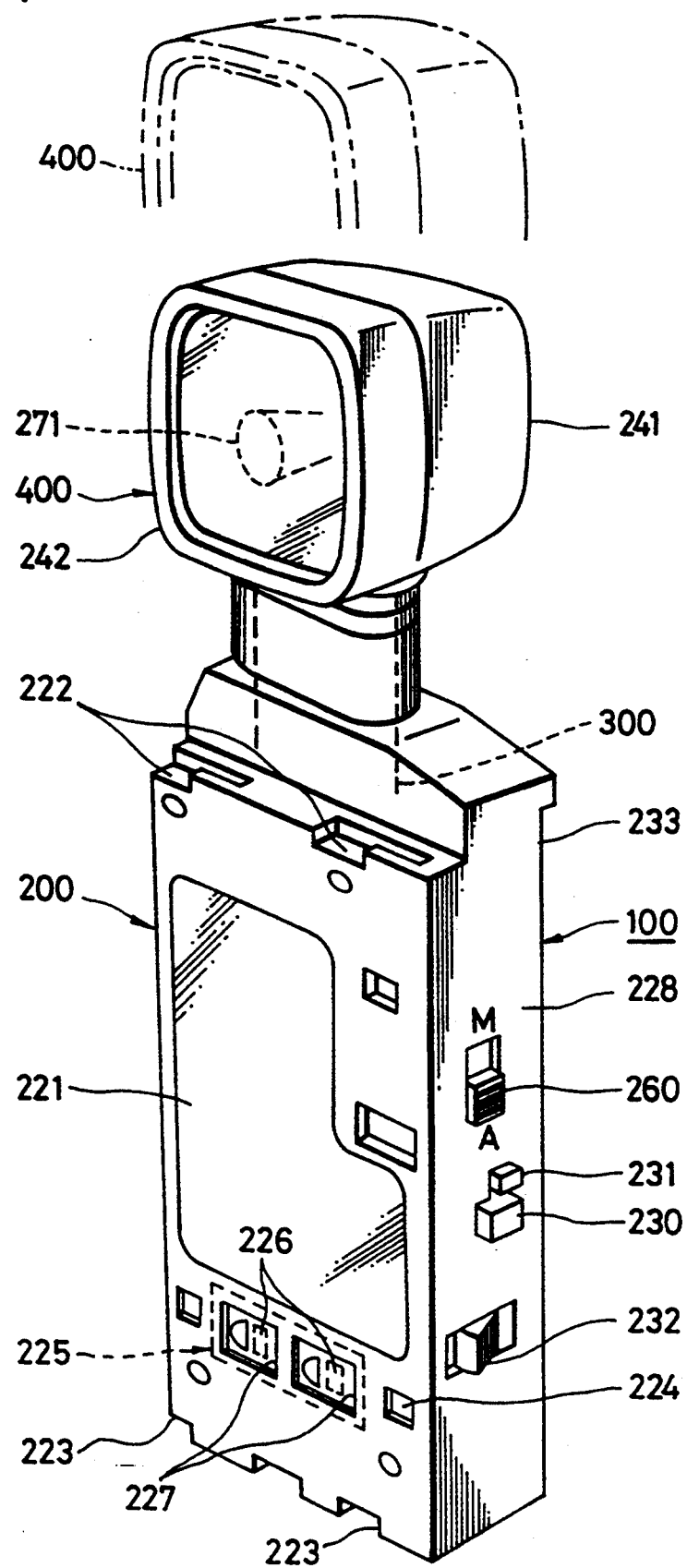
FIG. 7 is a perspective view of the external appearance of the video lighting apparatus of the present invention and illustrating the same more fully.

FIG. 7 of the accompanying drawings shows an external appearance of an example of the video lighting apparatus 100 according to the present invention. Although this video lighting apparatus 100 is attached to the portable video camera K when in use, the video lighting apparatus 100 is not limited thereto and may be utilized as an illumination equipment without the video camera K. As shown in FIG. 7, the video lighting apparatus 100 comprises a video lighting apparatus body 200 in which printed circuit boards and so on are housed. Though not shown, a slide unit 300 is slidably attached to the video lighting apparatus body 200 and an illumination unit 400 is attached to the top of the slide unit 300.

The video lighting apparatus body 200 is shaped as substantially a flat box and engaging recesses 222 and 223 for fitting the video lighting apparatus body 200 to the attaching surface K1 of the video camera K. These engaging recesses 222 and 223 are formed on the upper and lower end portions of a front surface 221 side of the video lighting apparatus body 200. A locking recess 224, into which a locking protrusion 170 of the video camera K is inserted, is formed on the lower portion side of the front surface 221. Further, openings 227 for exposing electrode portions 226, of an electrode apparatus 225 housed in the video lighting apparatus body 200 are formed on the front surface 221, as will be described later.

Figure 1:
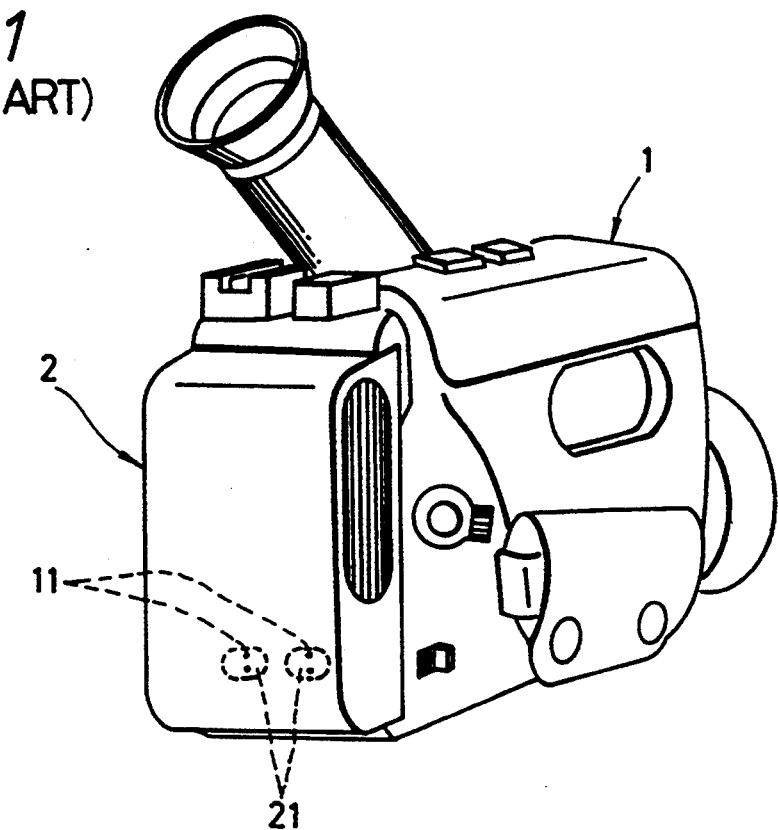
FIG. 1 is a perspective view illustrating a video camera and a battery pack attached to the video camera when the video camera is in use according to the prior art.
Figure 2:
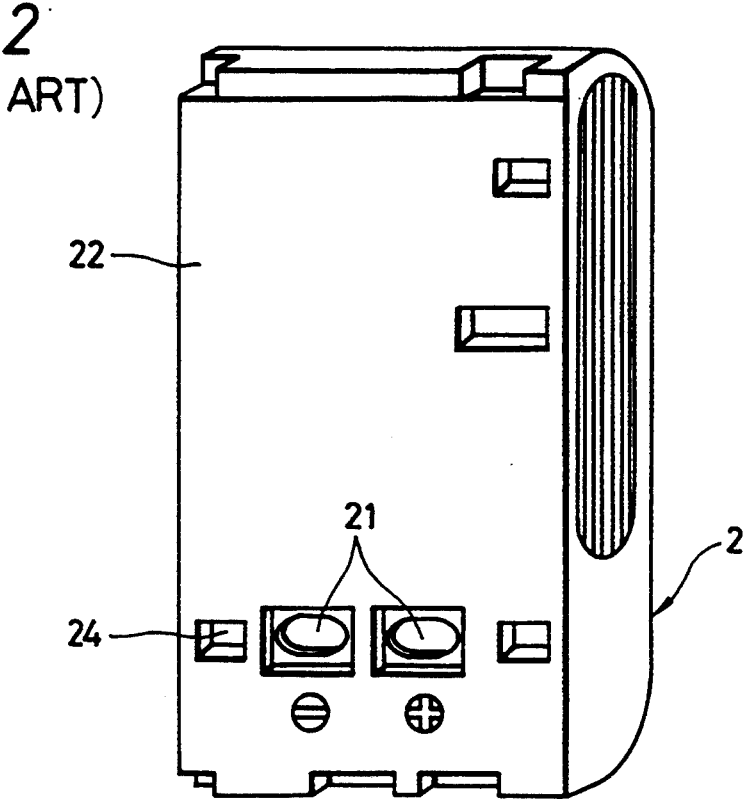
FIG. 2 is a perspective view illustrating an overall arrangement of the conventional battery pack shown in FIG. 1 from the rear side.

On one side surface 228 of the video lighting apparatus body 200, there are provided an automatic/manual change-over switch 260, an illumination unit elevating button 230, a lock level 231 for locking the illumination unit elevating button 230 and an operation portion of an engagement releasing lever 232 that releases the engagement of the battery pack C (see FIG. 2) which are housed within the video lighting apparatus body 200. A rear surface 233 of the video lighting apparatus body 200 is the surface to which the battery pack C is attached, and therefore is recessed so as to accept the battery pack C.

Figure 8A:
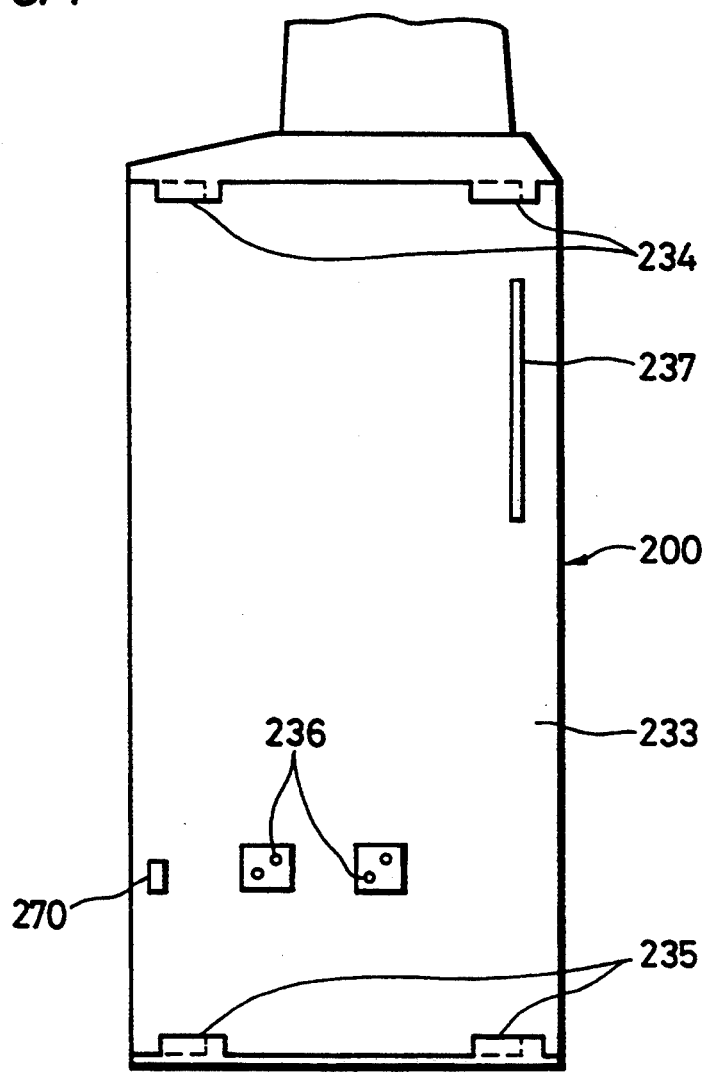
FIG. 8A is a rear view of the video lighting apparatus shown in FIG. 7.
Figure 8B:
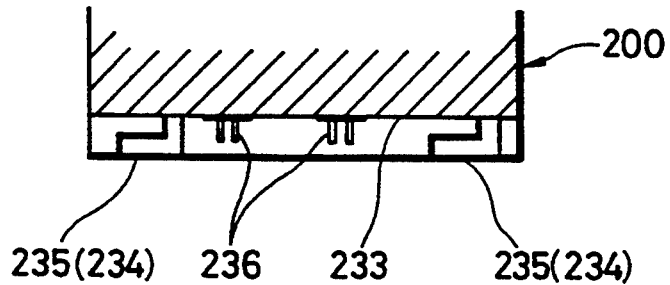
FIG. 8B is a fragmentary, cross-sectional view of FIG. 8A.

On the upper and lower portions of the rear surface 233, there are provided engagement portions 234 and 235 with which the engagement recesses 122, 123 of the battery pack C are engaged and electrode portions 236, 235 (positive side and negative side) which connect the battery pack C and the video lighting apparatus body 200 electrically as shown in FIG. 8A. The electrode portions 236 are protruded as pins and constantly spring-biased toward the outside so as to become freely retractable.

A retractable locking protrusion 270 is formed on the rear surface 233 and this retractable locking protrusion 270 is inserted into the locking recess 124 of the battery pack C. Further, a reference line 237 is drawn on the rear surface 233. In use, if the battery pack C is pushed horizontally with the side end thereof coincident with the reference line 237 and then moved in the lateral direction, then the battery pack C is attached to the rear surface 233 of the video lighting apparatus body 200.

Further, referring to FIG. 7, the illumination unit 400 comprises a frame member 241 secured to the slide unit 300, a protecting cover 242 fitted to the frame member 241 and a halogen lamp 271 installed in the inside of the frame member 241. The protecting cover 242 is detached from the frame member 241 when slightly turned in one direction. The illumination unit 400 is popped upwardly by operating the illumination unit elevating button 230 (as shown by a two-dot chain line in FIG. 7) as will be described later, thereby preventing the illumination light from being cut off by the video camera K.

Figure 9:
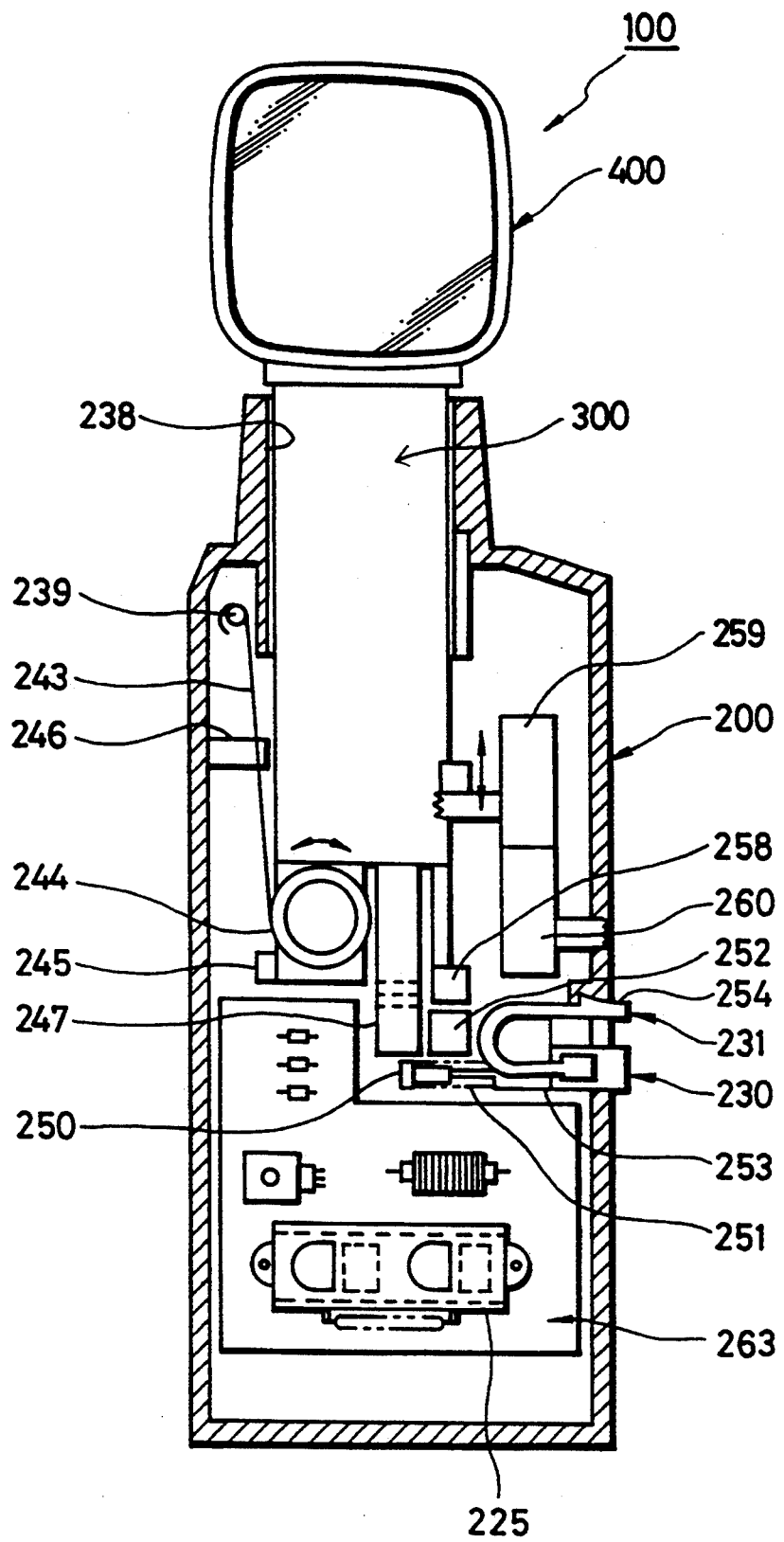
FIG. 9 is a partial cross-sectional view of the video lighting apparatus of FIG. 7 and illustrating the inside structure of the video lighting apparatus.

The inside structure of the video lighting apparatus 100 will be described below. FIG. 9 of the accompanying drawings shows a cross-sectional view of the video lighting apparatus 100. Referring to FIG. 9, the slide unit 300 is shaped as a plate and loosely fitted into a guide slit 238 formed on the upper portion of the video lighting apparatus body 200. One end of a plate-shaped coiled spring 243 is engaged with a protrusion 239 formed on the upper portion of the video lighting apparatus body 200.

The other end of the coiled spring 243 is wound around a coil rewinding portion 244 rotatably attached to the lower portion side of the slide unit 300, whereby the slide unit 300 is constantly spring-biased in the upper direction. Thus, when the slide unit 300 is placed in its uppermost position, or a stopper 245 of the slide unit 300 is brought in contact with an engagement tab 246 of the video lighting apparatus body 200, the spring-biasing force of the coiled spring 243 is minimized, thereby protecting the stopper 245 and the engagement tab 246 from an extraordinarily strong force of the spring-biasing force of the coiled spring 243.

Figure 10:
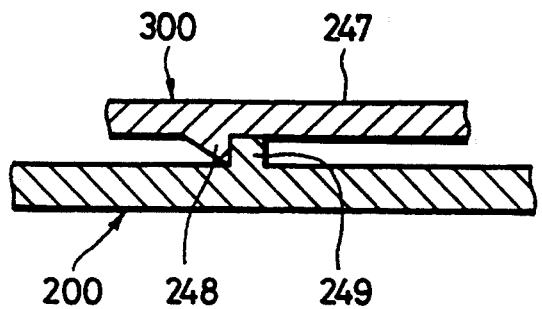
FIG. 10 is a fragmentary cross-sectional view illustrating the engaged condition of a slide unit.

A hook portion 247 for fastening the slide unit 300 to the video lighting apparatus body 200 is protrusively provided on the lower portion side of the slide unit 300. The hook portion 247 is made of a resilient material and has a hook member 248 formed on a lower surface thereof as shown in FIG. 10. The hook member 248 is fastened to a protrusion 249 of the video lighting apparatus body 200. The outer side surface of the hook member 248 is slanted so as to be easily hooked to the protrusion 249.

The engagement between the apparatus body 200 and the slide unit 300 is released by operating the above-mentioned illuminating unit elevating button 230 (FIG. 9). The illumination unit elevating button 230 is attached to the apparatus body 200 so as to become retractable by some suitable means (not shown) and is constantly spring-biased to the outside by the compression spring 251 engaged to an engagement portion 250 of the apparatus body 200.

Figure 11A:
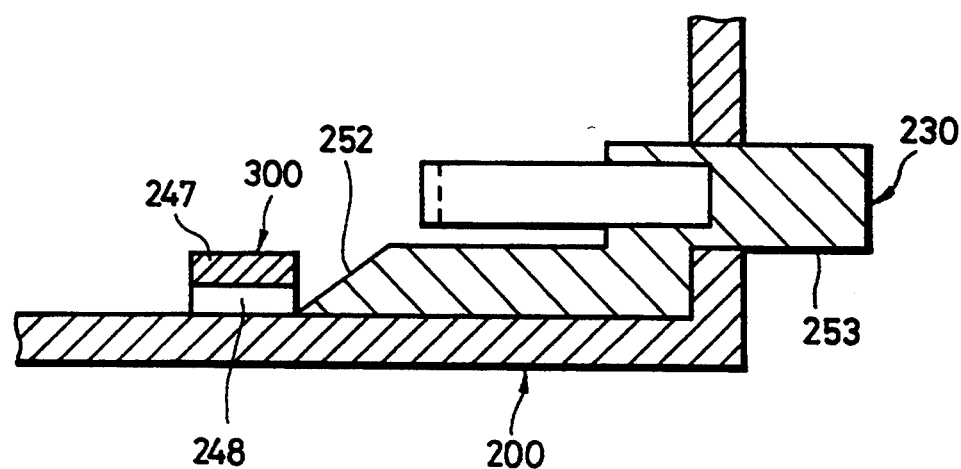
FIGS. 11A and 11B are respectively cross-sectional views to which references will be made in explaining operation of an illumination unit elevating button.
Figure 11B:
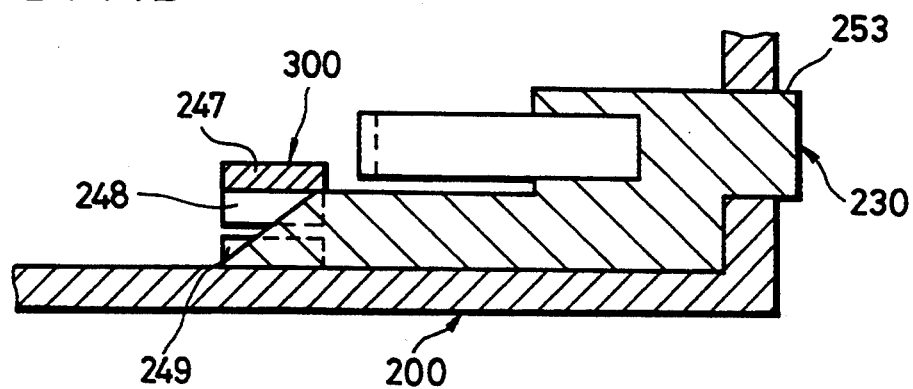

A top portion 252 of the illumination unit elevating button 230 is slanted downwardly as shown in FIG. 11A. The top portion 252 is used to push the engagement portion 247 of the slide unit 300 in the upward direction so that the engagement between the slide unit 300 and the apparatus body 200 can be released.

Figure 12A:
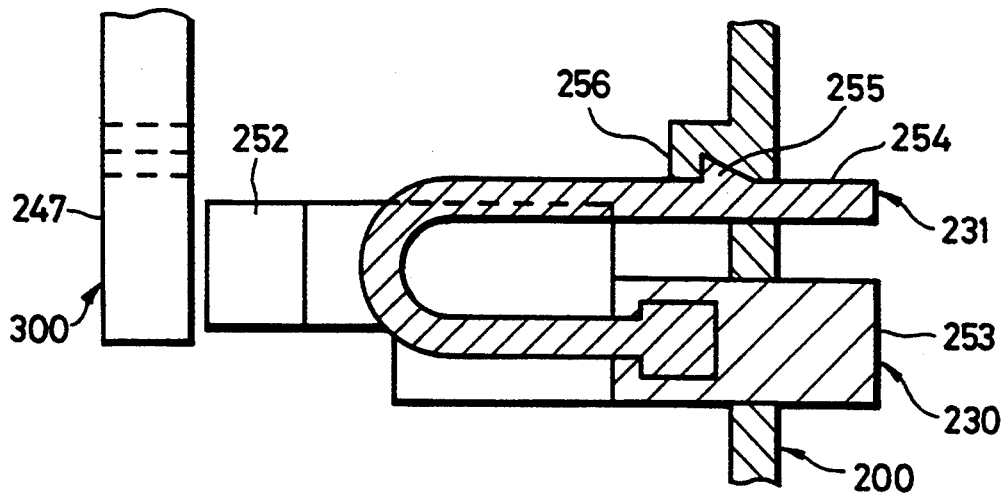
FIGS. 12A through 12C are respectively fragmentary cross-sectional views used to explain operation of a lock lever.
Figure 12B:
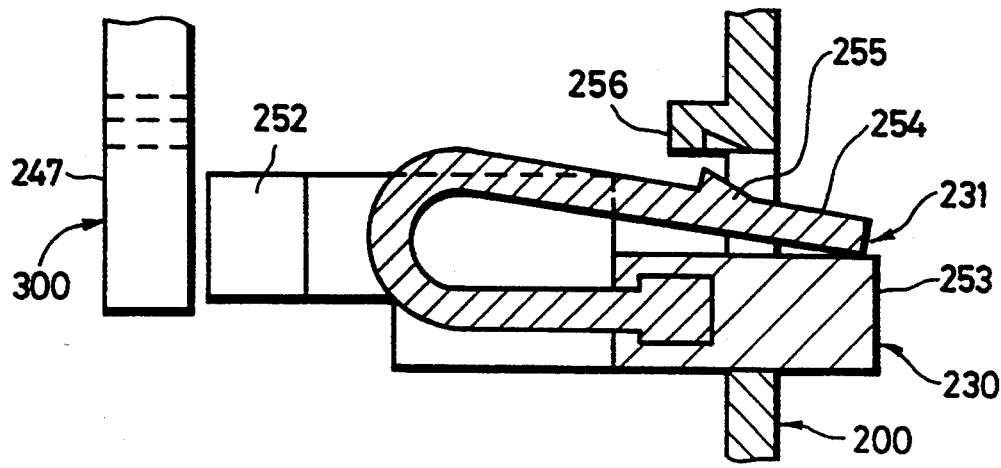
Figure 12C:
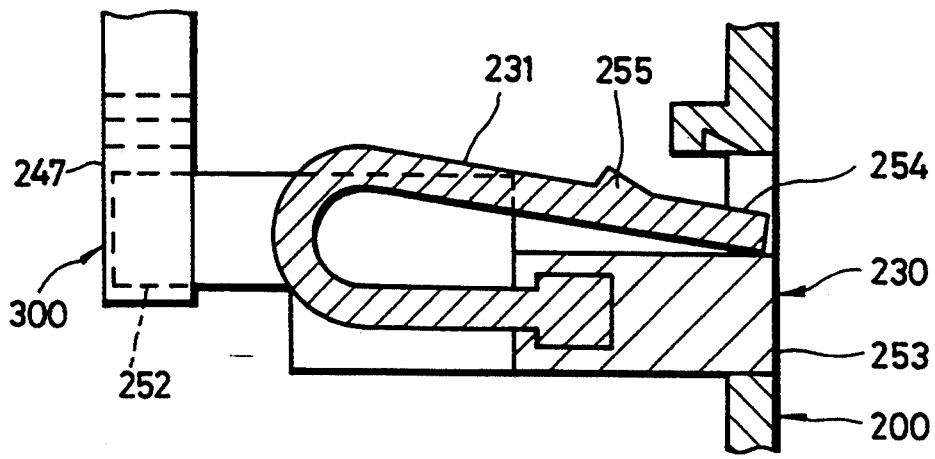

One end of the lock lever 231 of a U-letter configuration is fixed to the operation portion 253 of the illumination unit elevating button 230 as shown in FIG. 9. The lock lever 231 is made of a resilient material and is spring-biased in the opening direction. An engagement protrusion 255 is formed near the operation portion 254 of the lock lever 231 as shown in FIGS. 12A through 12C. When this engagement protrusion 255 is engaged with the engagement portion 256 of the apparatus body 200, the respective operation portions 253 and 254 can be prevented from being depressed inadvertently.

Figure 13:
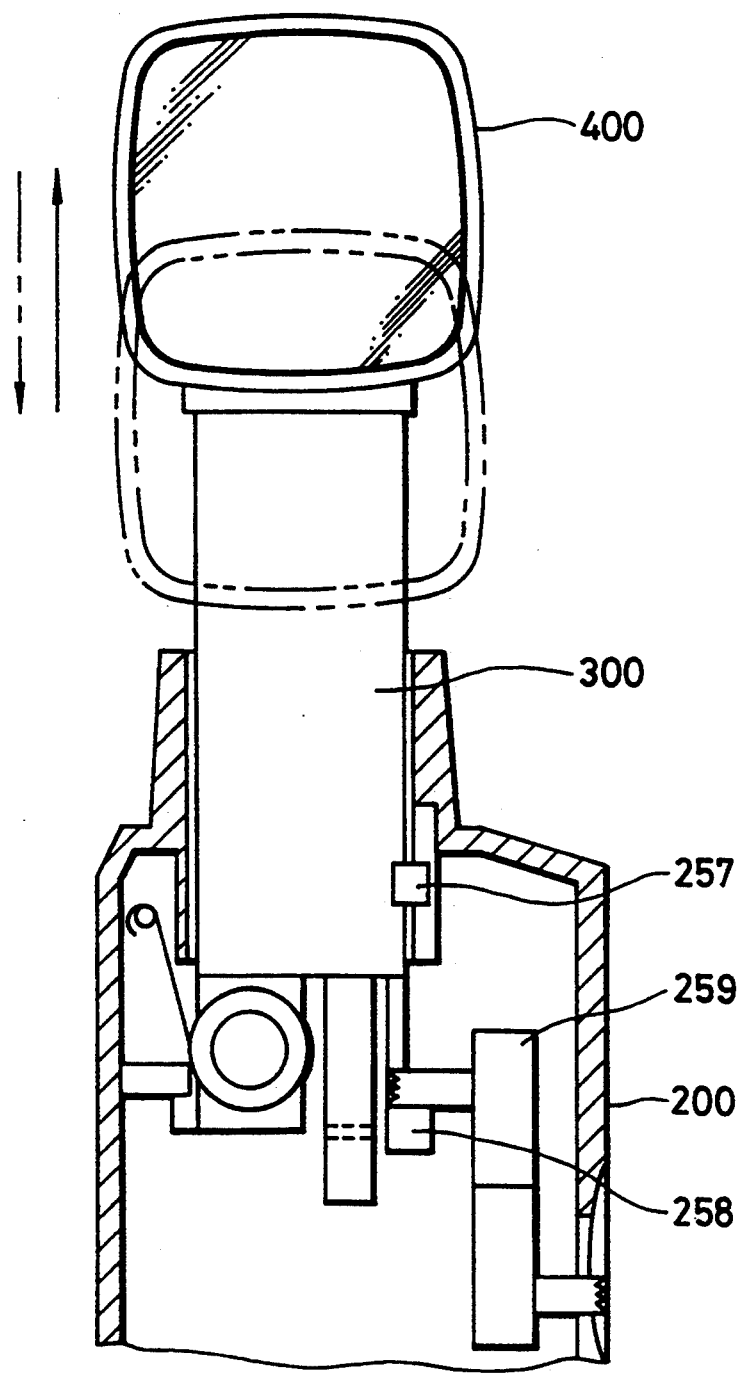
FIG. 13 is a cross-sectional view used to explain the projected state of the illumination unit.
Figure 14:
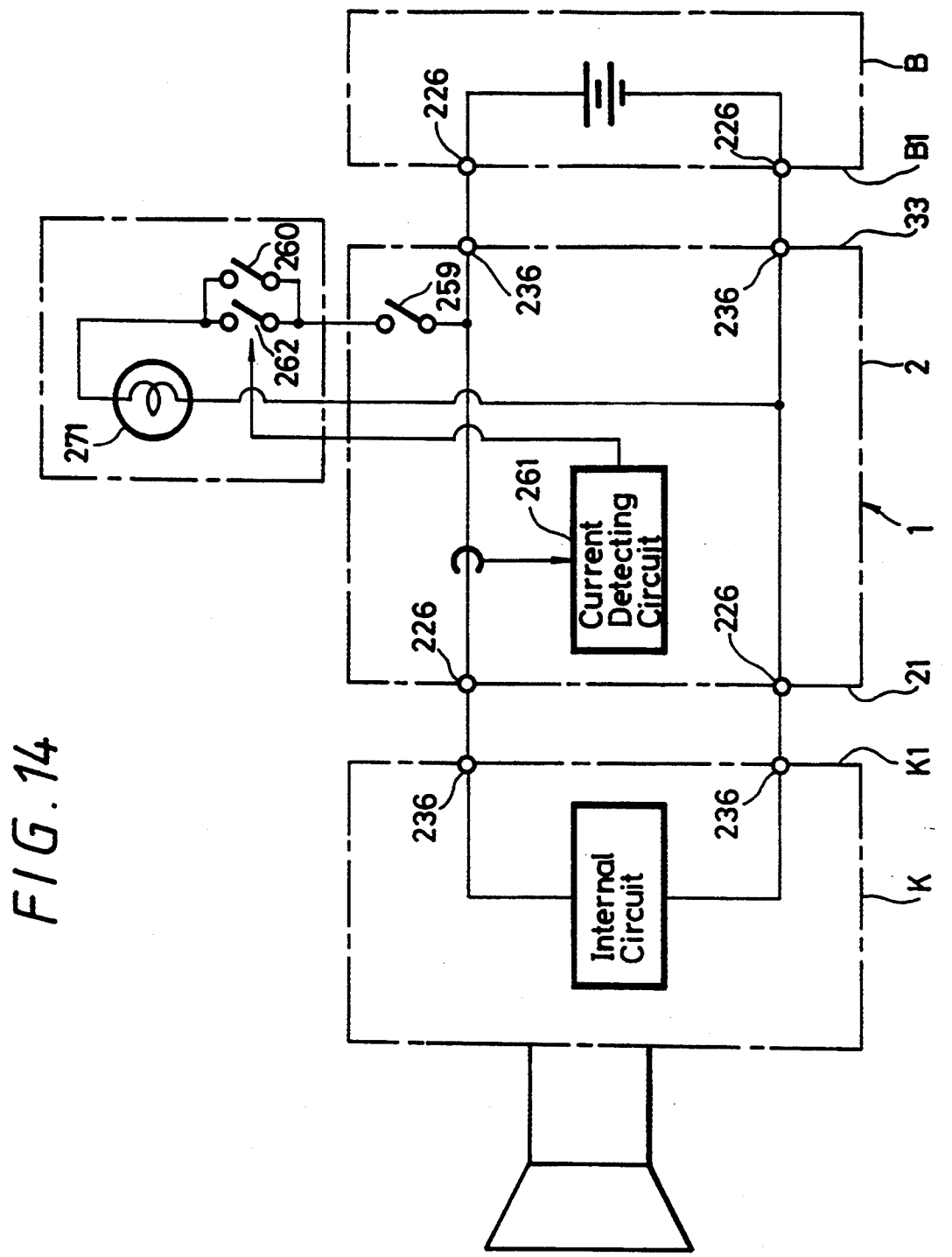
FIG. 14 is a schematic block diagram showing an electric circuit of the video light apparatus.

When the illumination unit elevating button 230 is operated, as shown in FIG. 12B, the operation portion 254 of the lock lever 231 is initially pushed downwards, thereby the engagement between the lock lever 231 and the apparatus body 200 being released. Then, under this condition, when the lock lever 231 and the illumination unit elevating button 230 are pushed into the inside, as shown in FIG. 12C, the engagement portion 247 of the slide unit 300 is pushed upwards by the top portion 252 of the illumination unit elevating button 230. Therefore, the slide unit 300 is moved in the upper direction as shown in FIG. 13.

Projection members 257 and 258 are provided on the side portion of the slide unit 300 with a proper distance therebetween. The projection members 257 and 258 are used to switch a power switch 259 of the illumination unit 400 in accordance with the slidable movement of the slide unit 300. More specifically, when the slide unit 300 is moved upwardly, the lower projection member 258 switches the power switch 259 to its ON state, while when the slide unit 300 is moved downwardly, the upper projection member 257 switches the power switch 259 to its OFF state.

When the power switch 259 is set in its ON state and the automatic/manual change-over switch 260 is set in the automatic side, an operation current flowing through the video camera K is detected by a current detecting circuit 261 at the same time when the recording by the video camera K is started, whereby an internal switch 262 is turned on to energize a halogen lamp 271 in the illumination unit 400. Further, when the automatic/manual change-over switch 260 is set in the manual side, if the illumination unit 400 is moved upwardly regardless of the operation condition of the video camera K, or the power switch 259 is turned on, the halogen lamp 271 is energized simultaneously.

Figure 15A:
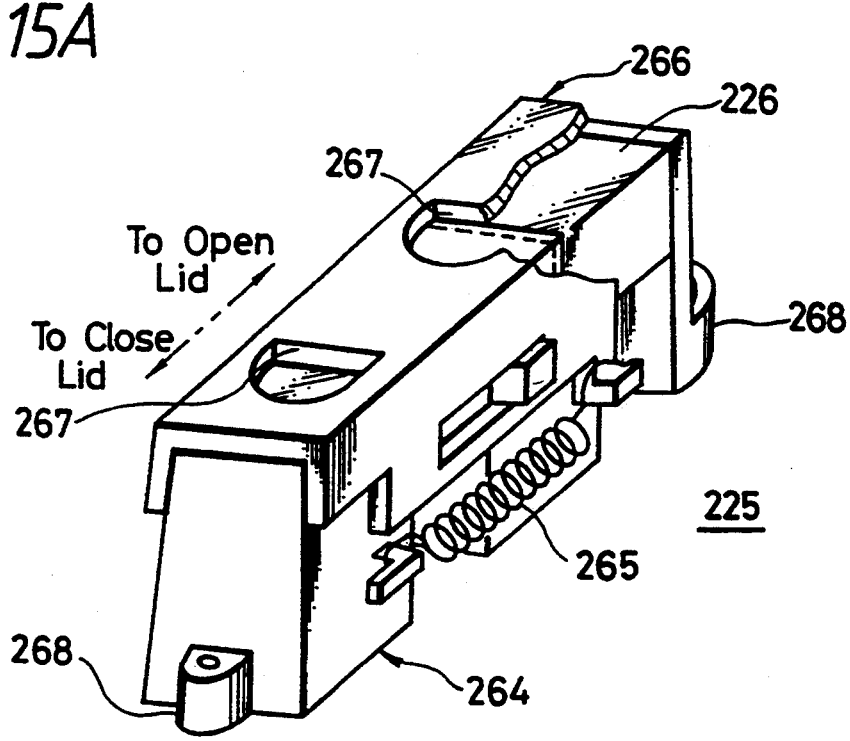
FIGS. 15A and 15B are respectively perspective views illustrating an arrangement of an electrode apparatus.
Figure 15B:
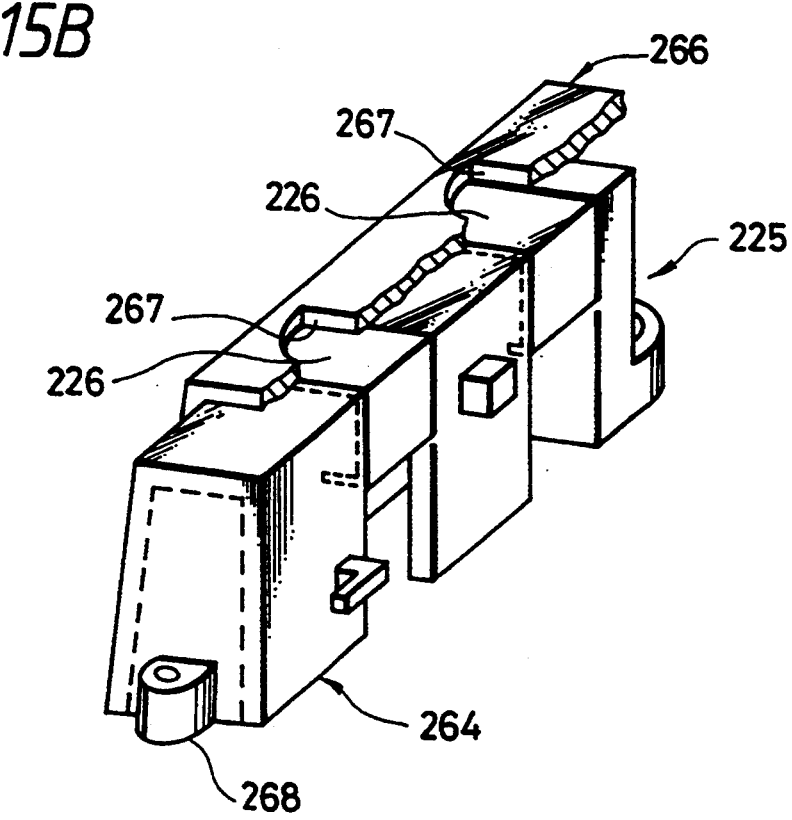

Referring back to FIG. 9, a base plate 263 on which the above-mentioned electric circuit is mounted is installed on the lower portion side of the apparatus body 200. The above-mentioned electrode apparatus 225 is attached to the upper surface side of the base plate 263. In this electrode apparatus 225, as shown in FIGS. 15A and 15B, the electrode portions 226 (plus side and minus side) are mounted on the upper surface of the base 264.

The electrode portions 226 are shielded by the electrode cover 266 which is constantly spring-biased in the lid-closing side by the tension spring 265. When the video lighting apparatus 100 is installed on the video camera K, the projected electrode portions 136 of the video camera K are moved in the lateral direction while being engaged with the openings 267, of the electrode cover 266, thereby the electrode cover 266 is opened as shown in FIG. 15B.

Thus, the electrode portions 136 of the video camera K and the electrode portions 236 of the video lighting apparatus 100 can be connected with each other. An attaching pedestal 268 is provided on the base 264. If this electrode apparatus 225 is employed, then the electrode portions 226, 226 can be prevented from inadvertently being short-circuited, thereby making it possible to prevent the internal circuit from being damaged.

While the light apparatus according to this embodiment is applied to the video light apparatus, the present invention is not limited thereto and can be applied to portable illumination apparatus such as a flash light and so on.

As described above, according to the present invention, the illumination unit is projected only when this lighting apparatus is in use, while the illumination unit can be prevented from being inadvertently projected when the lighting apparatus is not in use.

Therefore, according to the present invention, the light apparatus is easy to handle when not in use. When in use, the lighting apparatus of the present invention can illuminate the object sufficiently. Further, the present invention can achieve various effects, such as preventing the illumination unit from being damaged by other objects when the illumination unit is suddenly projected upon non-use.

A second embodiment of the present invention will now be described with reference to the drawings.

Figure 16:
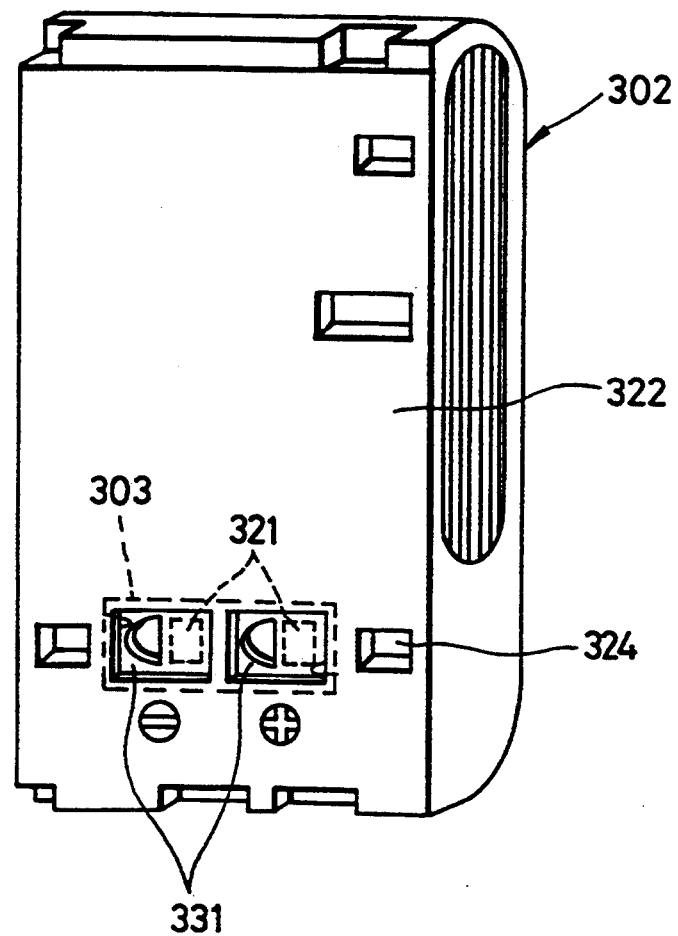
FIG. 16 is a perspective view illustrating the condition such that an electrode apparatus according to the present invention is attached to the battery pack.

FIG. 16 of the accompanying drawings shows a similar battery pack 302. To this battery pack 302, there is attached an electrode apparatus 303 in which electrode portions 321, 321 are shielded by an electrode cover 331 when the battery pack 302 is not coupled to a video camera, for example.

Figure 17A:
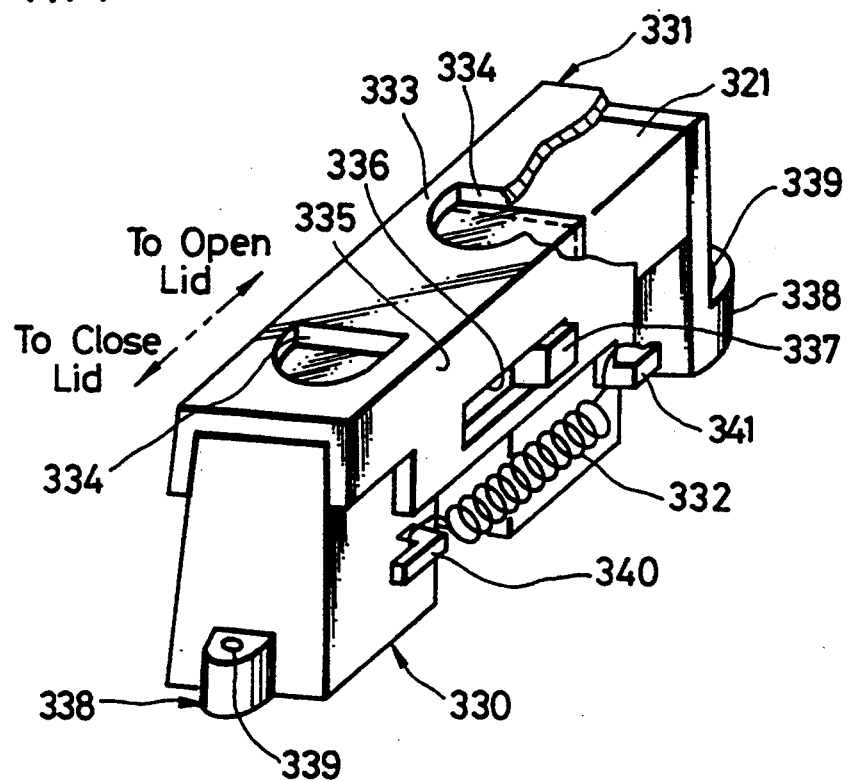
FIGS. 17A and 17B are respectively perspective views illustrating the arrangement of the electrode apparatus according to the embodiment of the present invention.
Figure 17B:
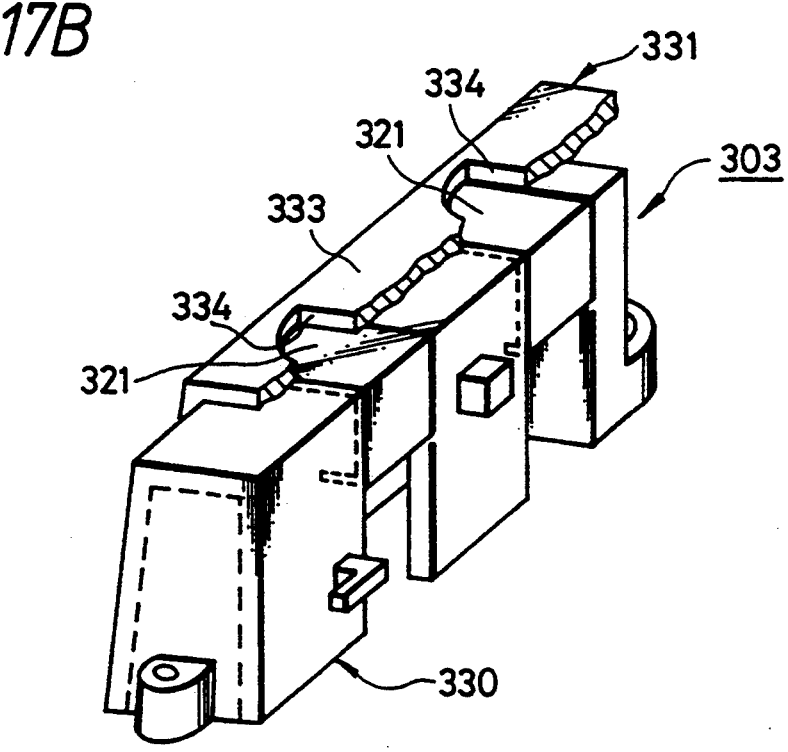

FIGS. 17 and 17B of the accompanying drawings show an example of the electrode apparatus 303. The electrode apparatus 303 is comprised of a base 330 of trapezoidal configuration in cross section, a pair of electrode portions 321 attached to the upper surface of the base 330 with a predetermined distance therebetween, an electrode cover 331 slidably fitted into the upper portion side of the base 330, and a tension spring 332 interposed between the base 330 and the electrode cover 331. Semicircular openings 334 are formed on an upper plate portion 333 of the electrode cover 331 so as to expose the electrode portions 321.

A projection member 337 of the base 330 is inserted into an oblong guide aperture (slit) 336 formed through a side plate portion 335 of the electrode cover 331, whereby the electrode cover 331 can be slidably moved in one direction while it can be prevented from being disengaged from the base 330. Also, the stroke amount of the electrode cover 331 is thereby restricted.

Pedestals 338 for wholly attaching the electrode apparatus 303 to the inside of the battery pack 302 are provided on the respective end sides of the base 330. Attaching apertures 339 are bored through the pedestals 338. One end of the tension spring 332 is engaged with an engagement member 340 of the base 330 and the other end thereof is engaged with an engagement member 341 of the electrode cover 331, whereby the electrode cover 331 is constantly spring-biased in the closing side.

Figure 18:
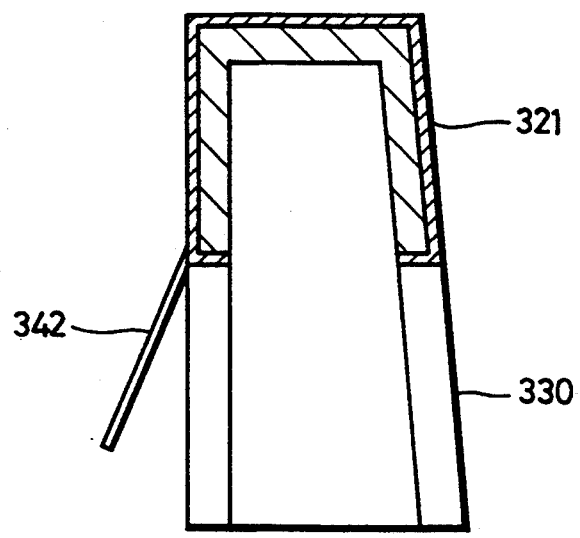
FIG. 18 is a cross-sectional view illustrating an electrode portion of the present invention more in detail.

Plate-shaped electrode portions (plus side and minus side) 321, are installed on the upper surface portion of the base 330. The electrode portions 321, are provided with narrow lead portions 342 shown in FIG. 18 in order to connect them to a circuit portion (not shown) located within the battery pack 302.

Figure 3:
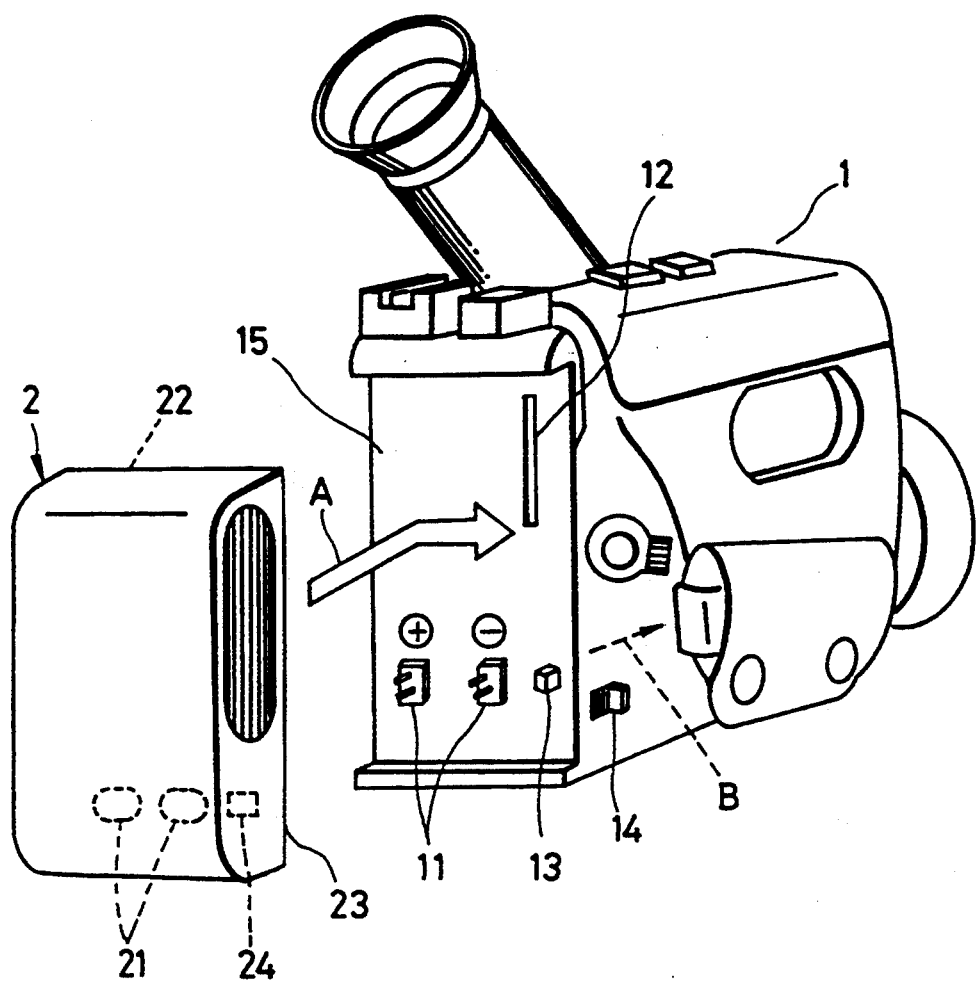
FIG. 3 is a perspective view of the video camera and the battery pack shown in FIGS. 1 and 2, and to which references will be made in explaining the way of how to attach the battery pack to the video camera.

When the electrode cover 331 is in the closed state as shown in FIG. 17A, the electrode portions 321 are shielded by the upper plate portion 333 of the electrode cover 331. Further, when the electrode cover 331 is in the opened state as shown in FIG. 17B, the electrode portions 321 are exposed from the openings 334 formed through the upper plate portion 333, whereby the electrode portions 11 (see FIG. 3) of the video camera 1, for example, can be brought in contact with the electrode portions 321 of the electrode apparatus 303.

Figure 19:
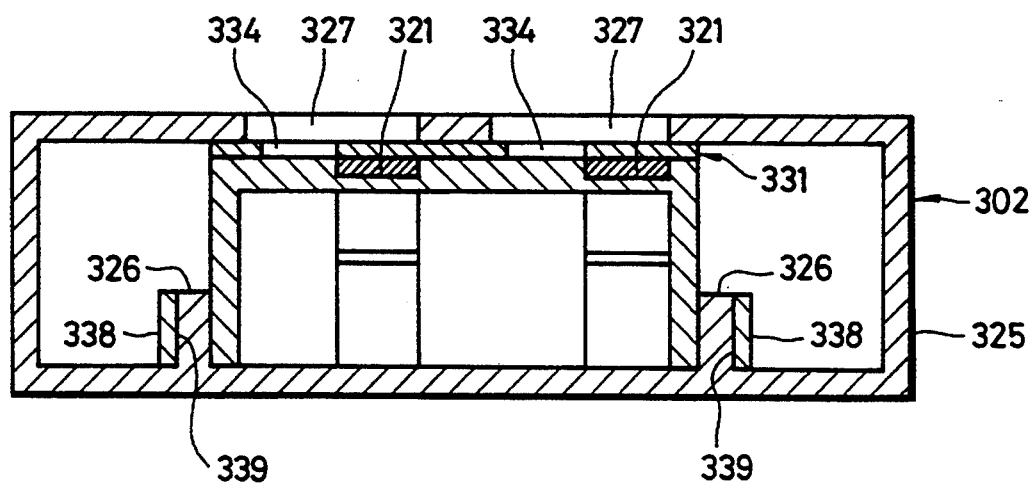
FIG. 19 is a cross-sectional view illustrating an attaching portion of the electrode apparatus according to the present invention.

Then, as shown in FIG. 19, the electrode apparatus 303 is secured to the battery pack 302 by engaging the attaching apertures 339 of the pedestals 338 into inside projections 326 provided on the frame 325 of the battery pack 302. Openings 327 formed through the upper surface side of the frame 325 are rectangular and large enough to expose the openings 334 of the electrode cover 331 in a whole range in which the electrode cover 331 is slidably moved.

Figure 20A:
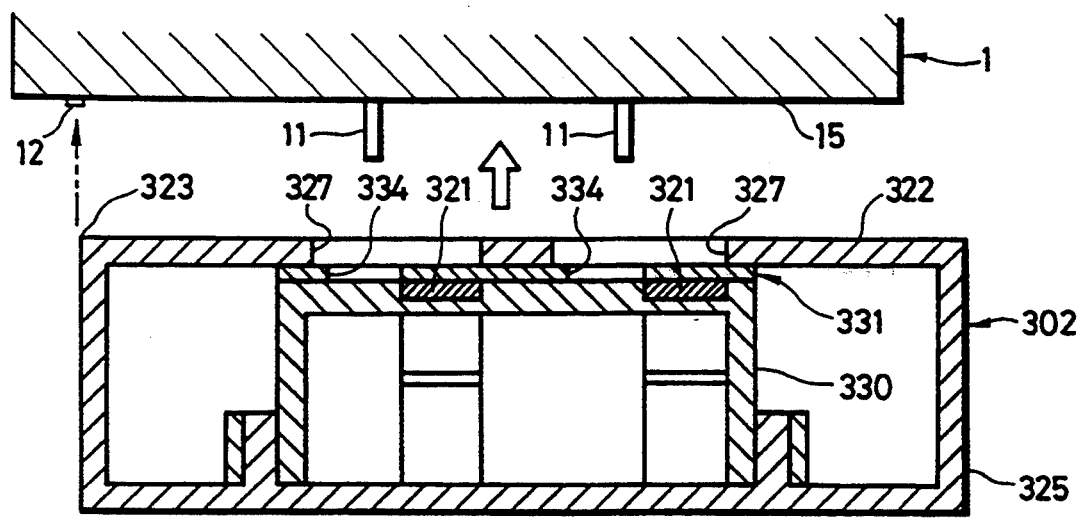
FIGS. 20A through 20C are respectively fragmentary cross-sectional views used to explain how the battery pack is attached to the video camera.
Figure 20B:
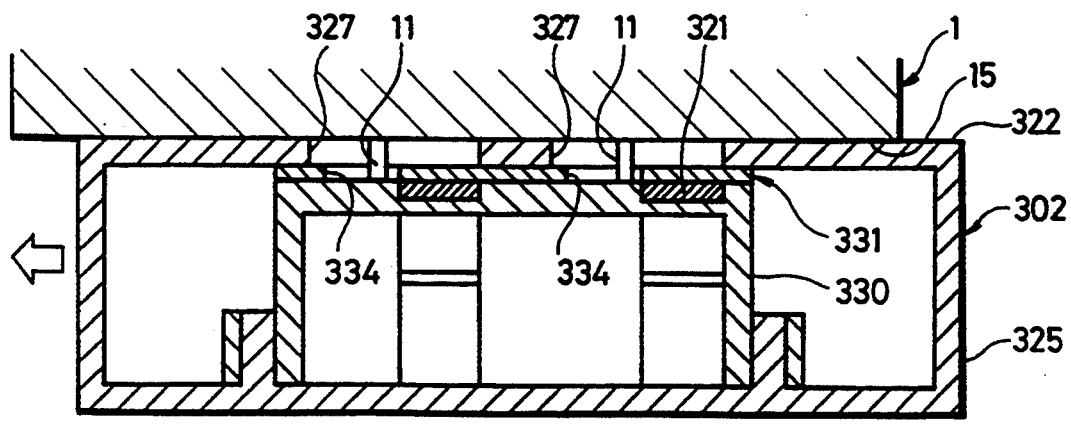

The thus constructed battery pack 302 of the electrode apparatus incorporated type is attached to the video camera 1 in a manner similar to the conventional manner. More specifically, as shown in FIG. 20A, the side end edge 323 of the battery pack 302 is matched with a reference line 412 of the video camera 1. Then, as shown in FIG. 20B, a contact surface 322 of the battery pack 302 is brought in contact with an attaching surface 15 of the video camera 1. At that time, the electrode portions 11 of the video camera 1 are inserted into the openings 327 of the frame 325 and the openings 334 of the electrode cover 331. Then, these electrode portions 11 are pushed by the upper surface of the base 330 so that the projected lengths thereof are reduced.

Figure 20C:
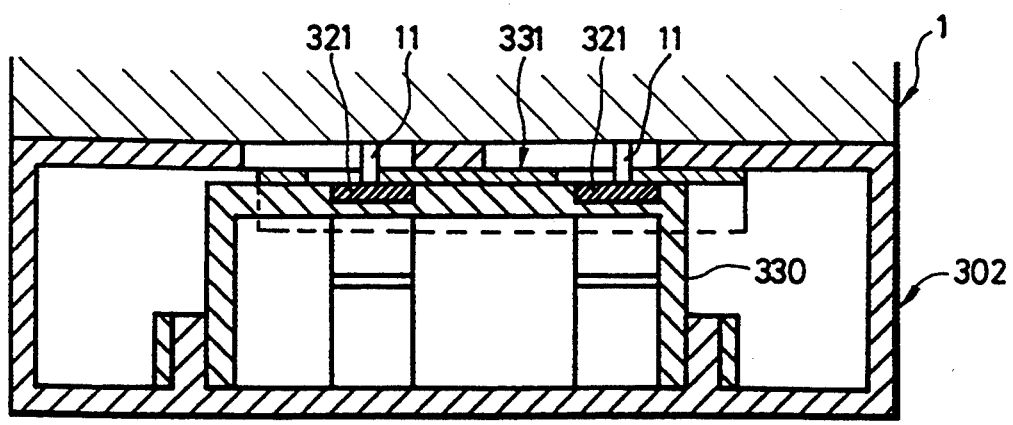

Then, the battery pack 302 is moved laterally in a predetermined direction (in the lefthand direction in FIG. 20B) while the battery pack 302 is brought in contact with the video camera 1. Consequently, as shown in FIG. 20C, the electrode portions 11 of the video camera 1 are brought in contact with the electrode cover 331 so that, when the battery pack 302 is moved in the lateral direction, then the electrode cover 331 is opened.

Then, the video camera 1 and the battery pack 302 are engaged with and secured to each other at the matched position. At that time, the electrode portions 11 of the video camera 1 contacts with substantially the central surface of the electrode portions 321 of the battery pack 302. Further, since the electrode portions 11 are spring-biased toward the electrode portions 321 by an inside spring (not shown), the video camera 1 and the battery pack 302 are coupled electrically in a reliable manner.

When the battery pack 302 is detached from the video camera 1, the battery pack 302 is moved laterally in the direction (in the righthand direction in FIGS. 20A to 20C) opposite to the direction in which the battery pack 302 is attached. At that time, the electrode cover 331 is spring-biased by the tension spring 332 (see FIG. 17) and therefore the electrode portions 321 are shielded by the electrode cover 331.

As described above, according to the second embodiment of the present invention, the electrode apparatus is provided with the electrode cover which constantly shields the electrode portion when it is not coupled to the video camera or the like. Also, this electrode cover can be opened by the corresponding electrode portion of the video camera or the like.

Therefore, if the second embodiment of the electrode apparatus of the present invention is applied to the battery pack, the video light or the like, when these equipments such as the battery pack, the video light or the like are utilized alone or carried alone, then the electrode portions can be prevented from being touched by metal pieces or fingers. Thus, the metal pieces touched can be prevented from being dissolved or the electrode portion can be prevented from being short-circuited, for thereby preventing the electric circuit provided within the equipment from being damaged. Further, the electrode portion can be prevented from being smudged by alien substances and therefore can be kept in a clean condition.

Having described the preferred embodiments of the invention with reference to the accompanying drawings, it is to be understood that the invention is not limited to those precise embodiments and that various changes and modifications thereof could be effected by one skilled in the art without departing from the spirit or scope of the invention as defined in the appended claims.

What is claimed is:

1. A battery pack attachable to an electronic apparatus comprising:
   a battery pack body housing a battery;
   engaging means for connecting said battery pack body with said electronic apparatus;
   electrode portions for supplying electric power from said battery to said electronic apparatus to which said battery pack is attached; and
   a slidable lid member covering said electrode portions, wherein said slidable lid member is slidably moved by protruded electrode portions of said electronic apparatus according to engaging operation of said engaging means for mechanically connecting said battery pack body and said electronic apparatus.

2. A battery pack according to claim 1, wherein said slidable lid member has D-shaped openings thereon.

3. A battery pack according to claim 2, wherein said protruded electrode portions engage a portion of at least one of said D-shaped openings and thereby open said slidable lid member when said battery pack and said electronic apparatus are connected.

4. An accessory pack attachable to an electronic apparatus comprising;
   an accessory pack body having a battery;
   engaging means for mechanically connecting said accessory pack body with said electronic apparatus;
   electrode portions for supplying electric power to said electronic apparatus; and
   a slidable lid member normally covering said electrode portions, wherein said slidable lid member is slidably moved by protruded electrode portions of said electronic apparatus according to engaging operation of said engaging means for mechanically connecting said battery pack and said electronic apparatus.

5. An accessory pack according to claim 4, wherein said slidable lid member has D-shaped openings thereon.

6. An accessory pack according to claim 5, wherein said protruded electrode portions on said battery pack body engage a curved portion of one said D-shaped openings of said slidable lid member and thereby open said slidable lid member when said battery pack and said electronic apparatus are connected.

7. A battery pack attachable to an electronic apparatus comprising:
   a battery pack body housing a battery;
   engaging means for connecting said battery pack body with said electronic apparatus;
   electrode portions provided on said battery pack body for supplying electric power from said battery to said electronic apparatus to which said battery pack is attached, said electric power being supplied to corresponding electrode portions protruding from said electronic apparatus; and
   a slidable lid member covering said electrode portions provided on said battery pack body, wherein said slidable lid member is moved by said electrode portions protruding from said electronic apparatus when said battery pack body is connected to said electronic apparatus with said engaging means.

8. A battery pack according to claim 7, wherein said engaging means includes a locking member and a plurality of recesses disposed on said battery pack body which are adapted to receive a corresponding number of engagement portions of said electronic apparatus.

9. A battery pack according to claim 7, wherein said slidable lid member has D-shaped openings thereon.

10. A battery pack according to claim 9, wherein said electrode portions protruding from said electronic apparatus engage a portion of at least one of said D-shaped openings and open said slidable lid member when said battery pack and said electronic apparatus are connected.

* * * * *